United States Patent [19]

Tohara

[11] Patent Number: 4,751,526
[45] Date of Patent: Jun. 14, 1988

[54] PEN RECORDER WITH IMPROVED ACCURACY

[75] Inventor: Masahiro Tohara, Tokyo, Japan

[73] Assignee: Kabushiki Kaisha Toshiba, Kawasaki, Japan

[21] Appl. No.: 31,265

[22] Filed: Mar. 30, 1987

[30] Foreign Application Priority Data

Mar. 31, 1986 [JP] Japan .................................. 61-71175

[51] Int. Cl.$^4$ ............................................ G01D 15/16
[52] U.S. Cl. ................................................. 346/139 R
[58] Field of Search ................. 346/139 R, 140 R, 27, 346/46, 141, 139 A, 139 B, 139 C, 139 D

[56] References Cited

U.S. PATENT DOCUMENTS

| 4,230,399 | 10/1980 | Moyroad | 354/10 |
| 4,444,519 | 4/1984 | Howell et al. | 400/124 |
| 4,595,278 | 6/1986 | Matsuo | 355/8 |

FOREIGN PATENT DOCUMENTS 54115172 9/1954 Japan .
5543403 3/1955 Japan .

Primary Examiner—E. A. Goldberg
Assistant Examiner—Mark Reinhart
Attorney, Agent, or Firm—Oblon, Fisher, Spivak, McClelland & Maier

[57] ABSTRACT

A pen recorder includes a pen position detecting portion for periodically or nonperiodically detecting the position of a pen, and a position correcting circuit for calculating a driving amount and a driving direction of a motor used for correcting a pen position, in accordance with a pen position detected by the pen position detecting portion and a recording position of the pen corresponding to an input signal. The pen position detecting portion detects an actual position of the pen when the pen is moved to perform a recording operation in response to the input signal. In accordance with the actual pen position and the recording position of the pen corresponding to the input signal, a driving amount and a driving direction of the motor for moving the pen are calculated by the position correcting circuit, to thereby correct the pen position.

21 Claims, 6 Drawing Sheets

F I G. 5
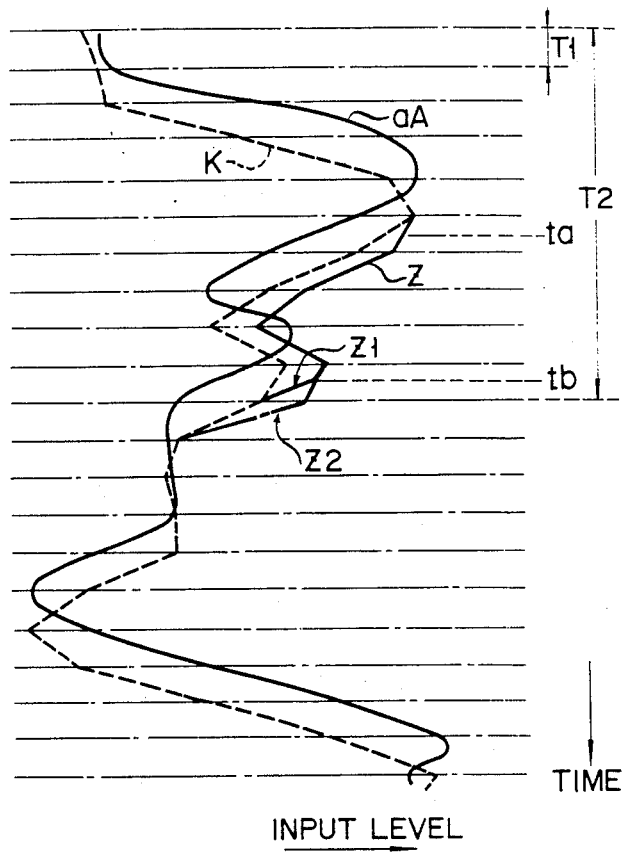
INPUT LEVEL
F I G. 1A
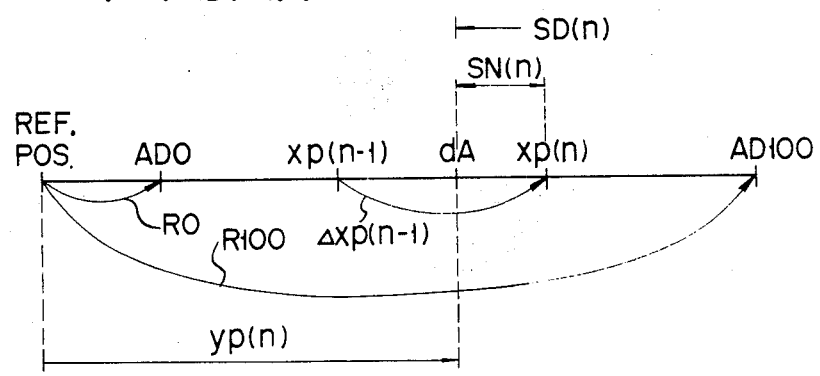

PEN RECORDER WITH IMPROVED ACCURACY

BACKGROUND OF THE INVENTION

1. Field of the Invention

The present invention relates to an improvement in the recording accuracy reliability of a pen recorder.

2. Discussion of the Background

In a conventional closed-loop-controlled pen recorder, when a pen is to be moved to a recording position corresponding to an analog input signal, an amount of motion of the pen is detected as an angular interval by a potentiometer or the like, and the angular interval is fed back to a differential amplifier for detecting an error. In this case, like a slide-wire resistor, after the potentiometer has been operated for a certain period of time, an electrical contacting state at its sliding portion sometimes becomes poor. When poor contact occurs, the pen cannot be accurately controlled to be in the proper position defined by the analog input signal, thereby degrading the recording accuracy and operational reliability, and shortening the service life of the recorder. In addition, in the case of a multi-pen type recorder, since potentiometers must be provided for a plurality of pens, the recorder is necessarily larger. Furthermore, when recording accuracy is to be improved by using a potentiometer of a high-accuracy type, the cost is increased.

On the other hand, the inventor of the present application has considered an open-loop-controlled pen recorder which uses a stepping motor, and calculates the step number and a step rotation direction for moving a pen to a new recording position, in accordance with data of the previous and new recording positions, thereby performing a recording operation. However, in a pen recorder of this type, when a pen position is erroneously deviated for some reason, the pen cannot return from the deviated position to a correct recording position, so that reliable recording cannot be obtained thereafter.

Thus, in the conventional closed-loop-controlled pen recorder, a problem is posed in terms of the reliability, accuracy, and service life of a potentiometer for detecting a pen position, which is required for each pen. In a multi-pen type recorder, the recorder is enlarged in size by adopting a plurality of potentiometers, and the cost is increased. On the other hand, in the above open-loop-controlled pen recorder, when the pen position is erroneously deviated, reliability of recording data obtained thereafter will be lost.

SUMMARY OF THE INVENTION

It is accordingly an object of the present invention to provide a pen recorder, which can be realized without using a potentiometer having the various abovementioned problems, and which can automatically correct erroneous deviations so as to perform exact recording, even when a pen position is erroneously deviated.

The present invention is applicable to a pen recorder in which a driving amount, etc. of a motor for moving a pen is determined in accordance with a new recording position of the pen, corresponding to an input signal, and a present pen position. The pen recorder includes a pen position detecting means for periodically or non-periodically detecting a position of the pen, and a position correcting means for calculating a driving amount and a driving direction of the motor for correcting the pen position in accordance with the pen position, detected by the above pen position detecting means, and a recording position of the pen, corresponding to the input signal. The pen position detecting means detects an actual position of the pen, as needed, when the pen is moved to perform a recording operation in response to the input signal. In accordance with the actual pen position and the recording pen position corresponding to the input signal, the position correcting means calculates the driving amount and the driving direction of the motor for moving the pen so as to correct the pen position.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1A is a graph for explaining open-loop-control of a pen position of the pen recorder in FIG. 1;

FIG. 5 is a graph showing an example of recording data by the pen recorder of FIG. 1;

DETAILED DESCRIPTION OF THE PREFERRED EMBODIMENTS

Figure 1:
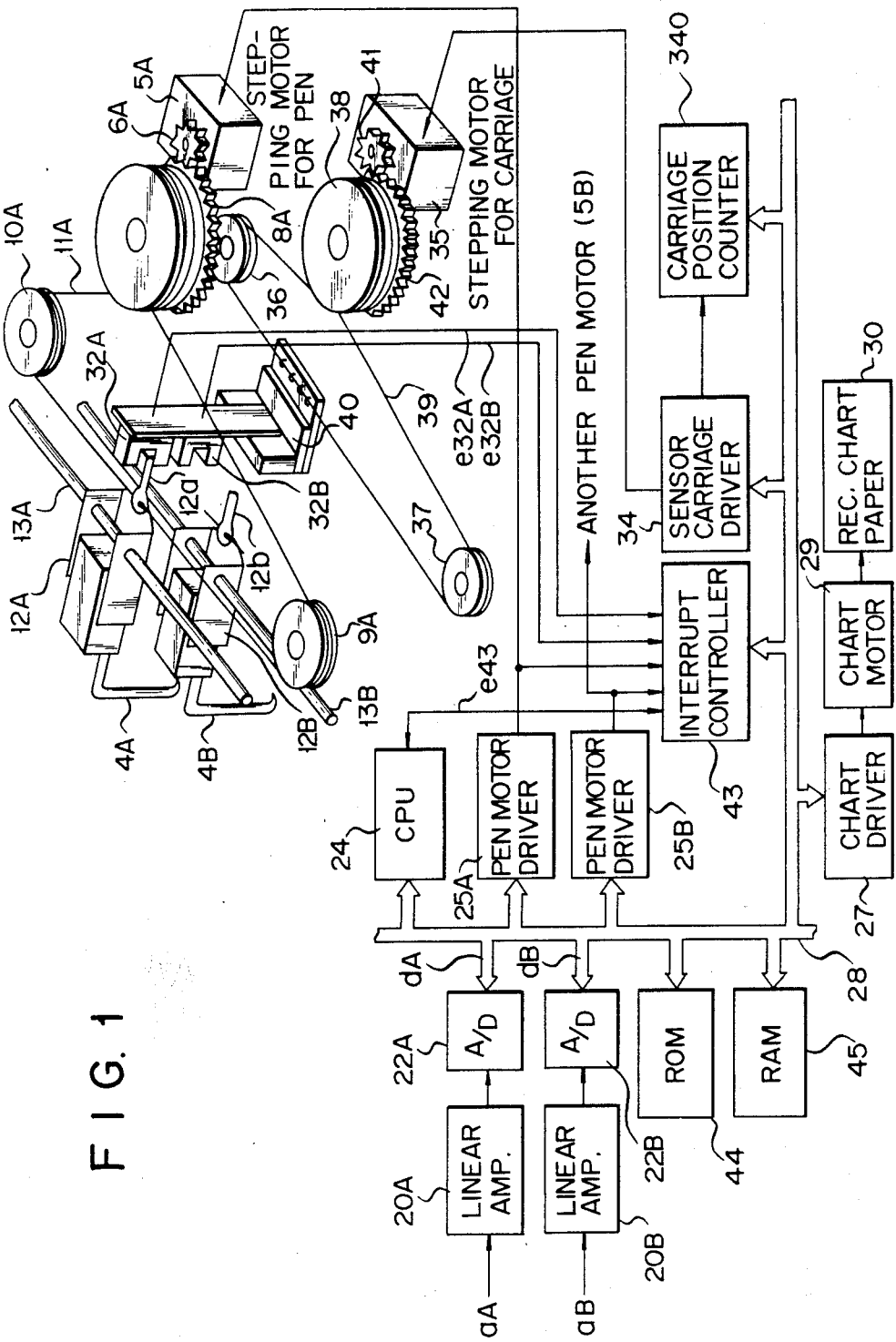
FIG. 1 is a block diagram of an arrangement of a pen recorder according to an embodiment of the present invention.

Preferred embodiments of the present invention will now be described in detail with reference to the accompanying drawings. Note that throughout the drawings, the same or similar parts are denoted by the same or similar reference numerals, and a redundant description thereof will be omitted.

FIG. 1 is a block diagram of a pen recorder according to an embodiment of the present invention. Analog input signals aA and aB are supplied to A/D (Analog/Digital) converters 22A and 22B through linear amplifiers 20A and 20B, respectively, and converted into digital input signals dA and dB. In this pen recorder, pen motor (stepping motor) drivers 25A and 25B and chart driver 27 are connected to CPU (or microcomputer) 24 through bus 28. In accordance with instructions generated by CPU 24, drivers 25A, 25B, and 27 are operated.

Driver 25A receives, from CPU 24, data of a step rotation direction and the number of steps (to be referred to as the step number hereinafter) of stepping motor 5A, and step-drives motor 5A. Similar to driver 25A, driver 25B receives, from CPU 24, data of a step rotation direction and the step number of another stepping motor 5B, and step-drives motor 5B. Driver 27 receives chart speed data from CPU 24, and controls rotation speed of chart motor 29 so that the feed speed of recording chart paper 30 corresponds to the speed of the received data.

Photosensors 32A and 32B, each being formed of light-emitting and light-receiving elements, are disposed at a side opposite to pens 4A and 4B of carriages 12A and 12B. Photosensor 32A outputs pen position detection signal e32A, representing that the actual position of pen 4A is detected when an optical path from its light-emitting element to the light-receiving element is interrupted by projection 12a of carriage 12A. Photosensor 32B outputs pen position detection signal e32B representing that an actual position of pen 4B is detected when an optical path from its light-emitting element to light-receiving element is interrupted by projection 12b of carriage 12B.

Both photosensors 32A and 32B are moved parallel to the movement directions of pens 4A and 4B along guide rails 13A and 13B by the rotation of sensor carriage motor 35, driven by sensor carriage driver 34. More specifically, sensor carriage 40, having photosensors 32A and 32B thereon, is attached to wire 39 looped around pulleys 36, 37, and 38. The above parallel movement is performed by transmitting the rotation of motor 35 to carriage 40, through gears 41 and 42 and pulleys 36 to 38. Signals e32A and e32B, respectively output from photosensors 32A and 32B, are supplied to interrupt controller 43. Controller 43 supplies CPU 24 with interrupt instruction e43 for executing an interrupt routine (FIG. 4) when it receives, from CPU 24, an instruction for allowing the interruption after it receives signal e32A or e32B. Controller 43 can be constituted by, e.g., Intel Co. (U.S.A.) Model i8259.

Figure 2:
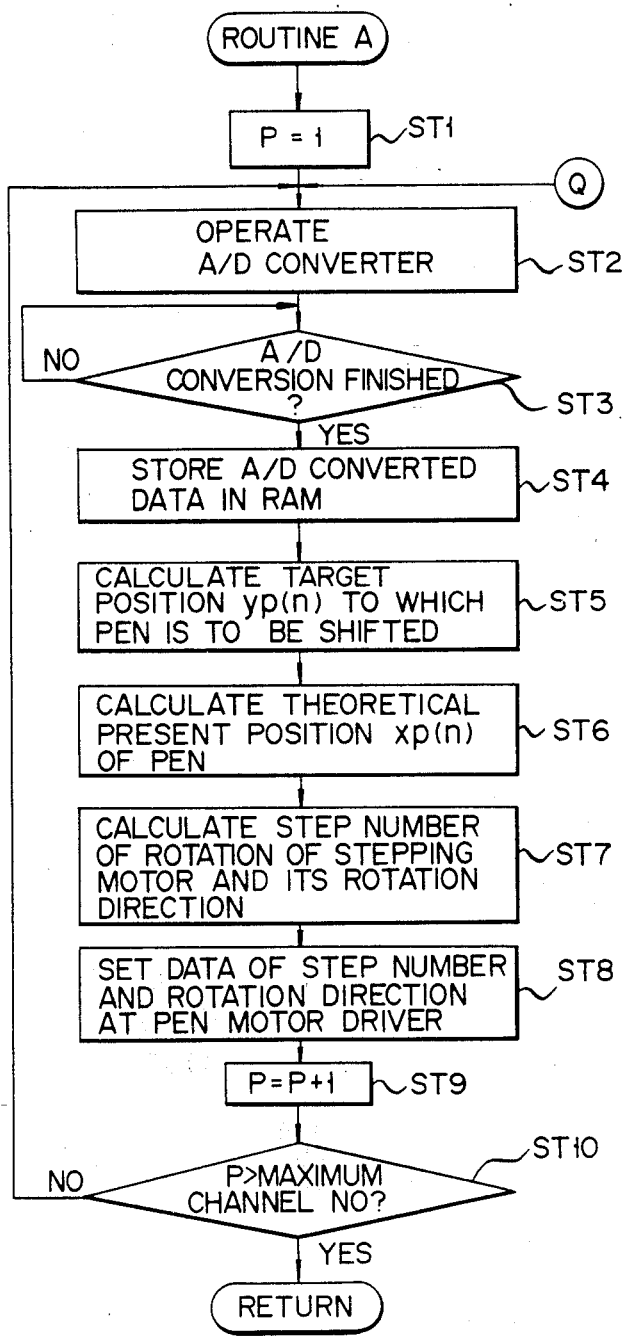
FIG. 2 is a flow chart for explaining a recording operation of the pen recorder of FIG. 1.
Figure 3:
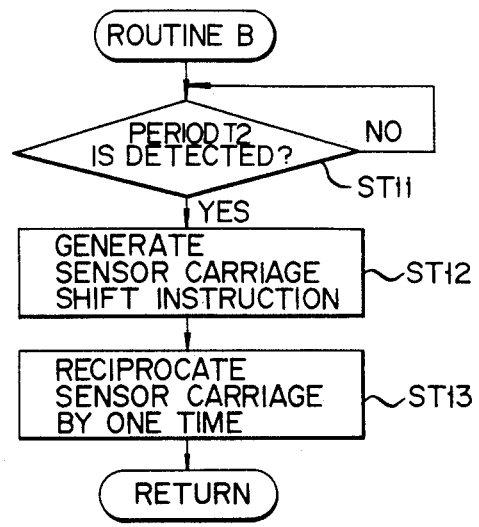
FIG. 3 is a flow chart for explaining a pen position detecting operation of the pen recorder of FIG. 1.
Figure 4:
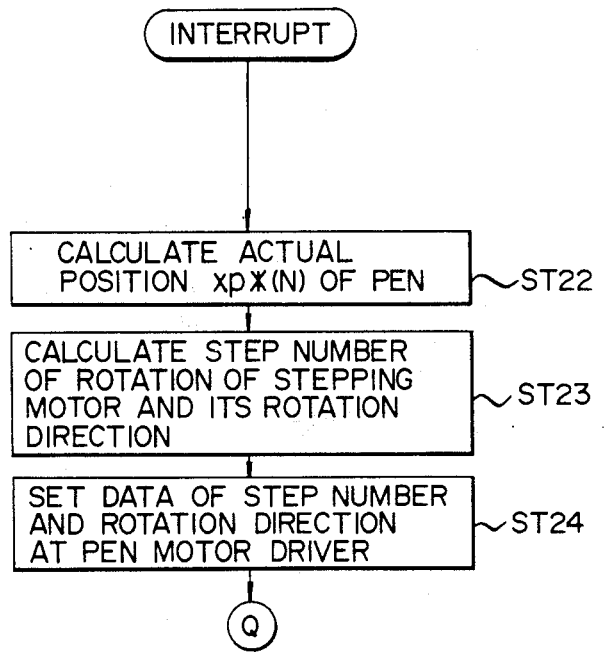
FIG. 4 is a flow chart for explaining a pen position correcting operation of the pen recorder of FIG. 1.

CPU 24 has an open-loop-control function for a normal recording operation (processing A), shown in FIG. 2, a control function for a pen position detecting operation (processing B), shown in FIG. 3, and a control function for interrupt processing, shown in FIG. 4. When processing B is executed, CPU 24 receives signal e32A or e32B and calculates an actual position of pen 4A or 4B, based on signal e32A or e32B.

In accordance with the information obtained regarding the above-mentioned actual position and the information pertaining to an accurate recording position corresponding to signal aA or aB which must be recorded by pen 4A or 4B, CPU 24 calculates the step rotation direction and the step number of motor 5A or 5B required for pen 4A or 4B to move from the actual position to the correct recording position, and sets them in driver 25A or 25B. This is the position correcting processing performed by CPU 24.

Note that bus 28 is connected to ROM (Read Only Memory) 44, which stores programs for the above-noted processing A and B and for interrupt processing, and to RAM (Random Access Memory) 45, for storing actual pen position data and sensor carriage position data, as needed.

Figure 1B:
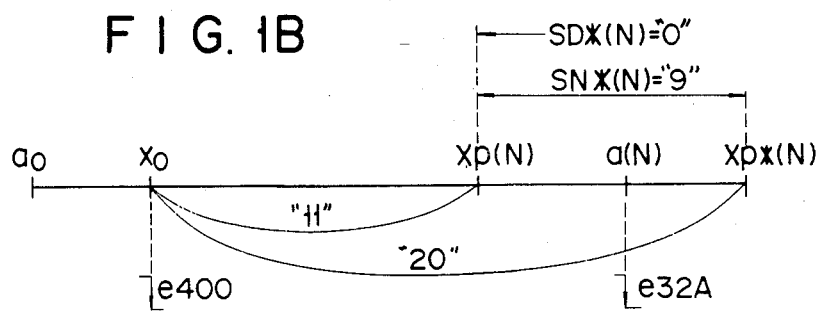
FIG. 1B is a graph for explaining a pen position correcting operation of the pen recorder in FIG. 1.

An operation of the pen recorder having the above arrangement will be described below with reference to FIGS. 1A and 1B, and flow charts of FIGS. 2 to 4. First, the normal recording operation (processing A) will be described with reference to the recording operation processing flow chart shown in FIG. 2. This recording operation processing is open-loop-controlled processing which, is executed within a relatively short period T1 (e.g., 100 msec).

CPU 24 sets channel P=1, corresponding to signal aA in step ST1, and starts an operation of converter 22A in next step ST2. Thus, analog input signal aA is converted into digital input signal dA. When A/D conversion is finished (i.e., Yes in step ST3), data of signal dA is temporarily stored in RAM 45 (step ST4). After signal dA is stored in RAM 45, in step ST5, CPU 24 calculates $y_p(n)$ representing which step of motor 5A corresponds to a recording position, defined by input signal aA, with respect to, e.g., the leftmost reference position of paper 30. In other words, $y_p(n)$ represents a position to which pen 4A is to be actually shifted, and is calculated by the following equation (1):

$$y_p(n) = R_0 + (R_{100} - R_0)(x_p(n) - AD_0)/(AD_{100} - AD_0) \quad (1)$$

where $R_0$ is a parameter representing the 0% recording position of paper 30 with respect to the above reference position in units of steps of motor 5A; $R_{100}$, a parameter representing the 100% recording position; $AD_0$, a value of digital input dA corresponding to analog input aA of 0%; $AD_{100}$, a value of input dA corresponding to input aA of 100%; and $x_p(n)$, an output value of converter 22A obtained during execution of the processing shown in FIG. 2. (Namely, $x_p(n)$ represents a digital value corresponding to input aA between 0% and 100%). Note that n of $y_p(n)$ and $x_p(n)$ indicates the processing number of the flows shown in FIG. 2. Data of $y_p(n)$ calculated in accordance with equation (1) is stored in RAM 45.

Then, in step ST6, CPU 24 reads out, from RAM 45, position data $x_p(n-1)$ (i.e., a theoretical value corresponding to input dA of the previous processing) of pen 4A stored during the previous (n=n−1) recording operation. In accordance with pen position data $x_p(n-1)$, and with the step rotation direction and the step number of motor 5A which is driven between the previous (n=n−1) and the present (n=n) processing cycles, CPU 24 calculates theoretical value $x_p(n)$ of the present position of pen 4A. Value $x_p(n)$ is calculated by the following equation (2);

$$x_p(n) = x_p(n-1) + \Delta x_p(n-1) \quad (2)$$

where $x_p(n-1)$ represents the theoretical value of the previous pen position, and $\Delta x_p(n-1)$ represents an amount of movement of pen 4A by the previous processing.

In step ST7, CPU 24 calculates step number SN(n) and step rotation direction SD(n) of motor 5A in accordance with the following equations (3) and (4), said SN(n) and SD(n) being required to match pen position theoretical value $x_p(n)$ with actual pen position $y_p(n)$:

$$SN(n) = |y_p(n) - x_p(n)| \quad (3)$$

$$SD(n) = \begin{cases} 1; & \text{if } y_p(n) - x_p(n) \geq 0 \\ 0; & \text{if } y_p(n) - x_p(n) < 0 \end{cases} \quad (4)$$

where SD(n)="1" represents clockwise rotation (right movement of pen 4A), and SD(n)="0" represents counterclockwise rotation (left movement of pen 4A).

In step ST8, SN(n) and SD(n) are set in driver 25A. Then, motor 5A is step-driven in a direction of data SD(n) by an amount of data SN(n) so as to rotate gears 6A and 8A. Thereafter, carriage 12A is moved by wire 11A so that information corresponding to input aA is recorded on paper 30. Then, channel P is incremented by 1 (step ST9), and the above recording operation processing is executed for all channels P (P=1, 2, ...), to thereby achieve the recording of information (signal waveforms) corresponding to signals aA, aB, ... (Yes in step ST10). Note that relationships among equations (1) to (4) are illustrated in FIG. 1A.

Pen position detecting processing B shown in FIG. 3 is executed for each period T2 (e.g., 10 sec). To be specific, when a timer counter or the like (not shown) detects that period T2 has elapsed (Yes in step ST11), CPU 24 supplies a drive instruction to driver 34 in step ST12. Thereafter, in step ST13, motor 35 is rotated, once, to reciprocate carriage 40 parallel to the movement direction of pens 4A and 4B.

By the reciprocation in step ST13, projections 12a and 12b of carriages 12A and 12B pass between the light-emitting and light-receiving elements of photosensors 32A and 32B, respectively. At this time, signals e32A and e32B, representing positions of pens 4A and 4B, are output from photosensors 32A and 32B, respectively.

Interruption with respect to CPU 24 is allowed only for an interval of forward movement of carriage 40 by software (i.e., interrupt is forbidden during backward movement thereof). During the forward movement, signals e32A and e32B, respectively output from photosensors 32A and 32B, are supplied to CPU 24, as interrupt instruction e43, through controller 43.

When signal e32A or e32B is generated, CPU 24 executes the position correcting processing, as shown in FIG. 4, by interruption. When the interruption is effected, CPU 24 calculates actual pen position $x_p^*(N)$ with respect to reference position $x_0$ of carriage 40 (step ST22). The value of $x_p^*(N)$ is calculated by the following equation (5):

$$x_p^*(N) = x_0 + [a_0 - a(N)] \quad (5)$$

where N corresponds to n of $y_p(n)$ and $x_p(n)$ when the interruption is effected.

Figure 6:
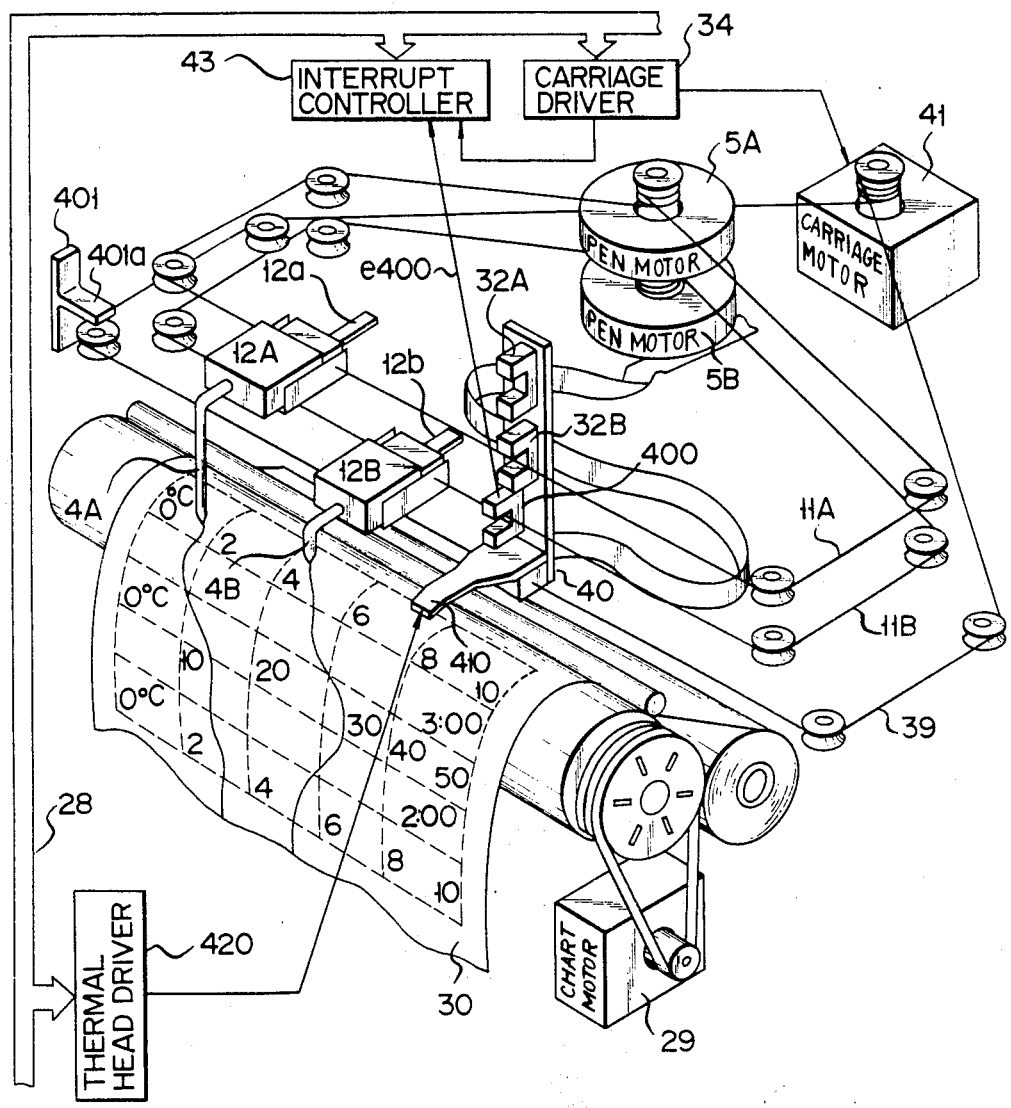
FIG. 6 is a perspective view of an important part of another embodiment of the present invention, showing an arrangement in which a thermal head for printing a scale for a chart is mounted on a sensor carriage.

An arrangement for calculating reference position $x_0$ of equation (5) is not shown in FIG. 1 but shown in FIG. 6. That is, photosensor 400 for detecting a home position is provided on carriage 40. When carriage 40 moves to its home position (reference position $x_0$), the optical signal path of photosensor 400 is interrupted by projection 401a of home position detecting portion 401. Then, photosensor 400 outputs home position detection signal e400. When signal e400 is output, CPU 24 sends a stop instruction to carriage motor 35. At this time, sensor carriage 40 is located at a position represented by reference position $x_0$ in equation (5), and initial value $a_0$ in equation (5) is set in carriage position counter 340. Incidentally, a(N) represents a content of counter 340 obtained when the interruption is effected by signal e32A or e32B. Data $a_0$ and a(N) are also supplied to CPU 24.

For a better understanding of the pen position correcting operation of the present invention, assume that the step position "11" of stepping motor 5A represents position $x_p(N)$ of pen 4A, obtained for a normal operation, with respect to reference position $x_0$. (That is, $x_p(N)$ represents the pen position on paper 30 accurately corresponding to signal aA or aB). It is further assumed that actual pen position $x_p^*(N)$ is erroneously deviated from position $x_0$ to the step position "20" for some reason (cf, FIG. 1B).

In step ST23 of FIG. 4, CPU 24 calculates step number SN*(N) and step rotation direction SD*(N) of motor 5A in accordance with the following equations (6) and (7):

$$SN^*(N) = |x_p(N) - x_p^*(N)| \quad (6)$$

$$SD^*(N) = \begin{cases} 1; \text{ if } x_p(N) - x_p^*(N) \geq 0 \\ 0; \text{ if } x_p(N) - x_p^*(N) < 0 \end{cases} \quad (4)$$

where N is used instead of parameter n to indicate that these equations are applied to the processing during interruption (i.e., N is used when signal e32A or e32B is generated). SD*(N)="1" represents clockwise rotation (right movement of pen 4A) of motor 5A obtained by the interruption processing in FIG. 4, and SD*(N)="0" represents counterclockwise rotation (left movement for pen 4A) of motor 5A obtained thereby.

In step ST24, SN*(N)=|11−20|=|−9|="9" and SD*(N)="0", calculated by using equations (6) and (7), are set in driver 25A. Then, motor 5A is step-driven in the counterclockwise direction by 9 steps. Pen 4A is thus moved to corrected position "11". (That is, the step number and the step rotation direction corresponding to "−9" are set in motor 5A, to thereby obtain a correct pen position). Note that when pen 4A is located at pen position "10", the step number and the step rotation direction corresponding to "+1" are set. Thereafter, the flow of FIG. 4 returns to step ST2 in FIG. 2 through connector Q. Thus, gears 6A and 8A are rotated by the step rotation of motor 5A, and carriage 12A is moved via wire 11A, so that exact recording is performed on paper 30.

FIG. 5 shows an example of actual recording data with respect to paper 30. In FIG. 5, broken line K represents a recording waveform corresponding to input signal aA represented by a solid line. Z represents erroneous recording data when a relative position of pen 4A with respect to paper 30 is erroneously deviated due to external disturbance occurred at time ta. This error is removed by the correcting operation of FIG. 4 at time tb. When the correcting operation is performed in accordance with equations (3) and (4), the recording waveform during its correcting process is represented by solid line Z1.

Note that the above correcting operation can be performed in accordance with equations (8) and (9) below. In this case, the recording waveform during the pen position correcting process is represented by alternate long and short dashed line Z2 in FIG. 5. Note that waveform of Z2 is obtained not in interval T2 shown in FIG. 5, but during movement of the pen just after the detection of an erroneous deviation of the pen.

$$SN^*(n) = |y_p(n) - x_p(n) + x_p(N) - x_p^*(N)| \quad (8)$$

$$SD^*(n) = \begin{cases} 1; \text{ if } y_p(n) - x_p(n) + x_p(N) - x_p^*(N) \geq 0 \\ 0; \text{ if } y_p(n) - x_p(n) + x_p(N) - x_p^*(N) < 0 \end{cases} \quad (9)$$

As described above, in the above embodiment, actual positions of pens 4A and 4B are periodically (T2) detected while pens 4A and 4B are moved to perform the recording operation in response to analog input signals aA and aB. In accordance with the above actual pen positions and the recording positions corresponding to signals aA and aB, the step numbers (SN(n)) and the step rotation directions (SD(n)) of motors 5A and 5B for moving the pens are calculated to correct the pen positions, so that the positions of pens 4A and 4B are corrected, as needed, while adopting an open loop controlled recording system.

Consequently, even when the pen position is erroneously deviated due to, e.g., dropping the machine of the pen recorder, the pen position can be automatically corrected to its accurate position. In this case, since an amount of correction of the pen position is normally zero, no practical problem will occur even if the frequency of the correcting operation is not so large. In this position correction, since a plurality of pen positions can be detected at the same time using noncontactively-operated photosensors 32A and 32B, a problem of poor contact of the potentiometer is not posed, so that a small and inexpensive pen recorder can be obtained.

Note that period T2 for executing the interruption processing of pen position correction shown in the flow of FIG. 4 need not be constant. Period T2 may be arbitrarily changed as long as it is longer than period T1 of the operation shown in the flow of FIG. 2. For example, when the pen recorder is installed in a vehicle which vibrates so as to cause a deviation of the pen position, T2 may be several seconds or less. On the other hand, when the present invention is applied to a pen recorder which is almost free from deviation of the pen position, T2 may be several minutes or more. In addition, period T2 may be changed in accordance with the kinds of analog input signals to be recorded.

FIG. 6 shows another embodiment of the present invention. In this embodiment, thermal head 410 and photosensor 400 for detecting a home position are provided on sensor carriage 40. Head 410 writes a predetermined scale, recording conditions, recording date, and the like, on paper 30, in accordance with data supplied from CPU 24 of FIG. 1, via thermal head driver 420. Along with reciprocation of head 410, pen position detection signals e32A and e32B are output from photosensors 32A and 32B, to thereby perform the interruption processing of FIG. 4.

In an arrangement of FIG. 6, whenever head 410 writes a scale of one line along a widthwise direction of recording chart paper 30, a pen position is automatically corrected by the interruption processing of FIG. 4. Therefore, even when something strikes against the pen recorder body during its operation and the pen position is erroneously deviated, the recording error due to the deviation can be removed within one scale segment of a chart feed direction written by head 410 on paper 30.

Note that head 410 in FIG. 6 can be replaced with a wire dot print head or the like.

Figure 7:
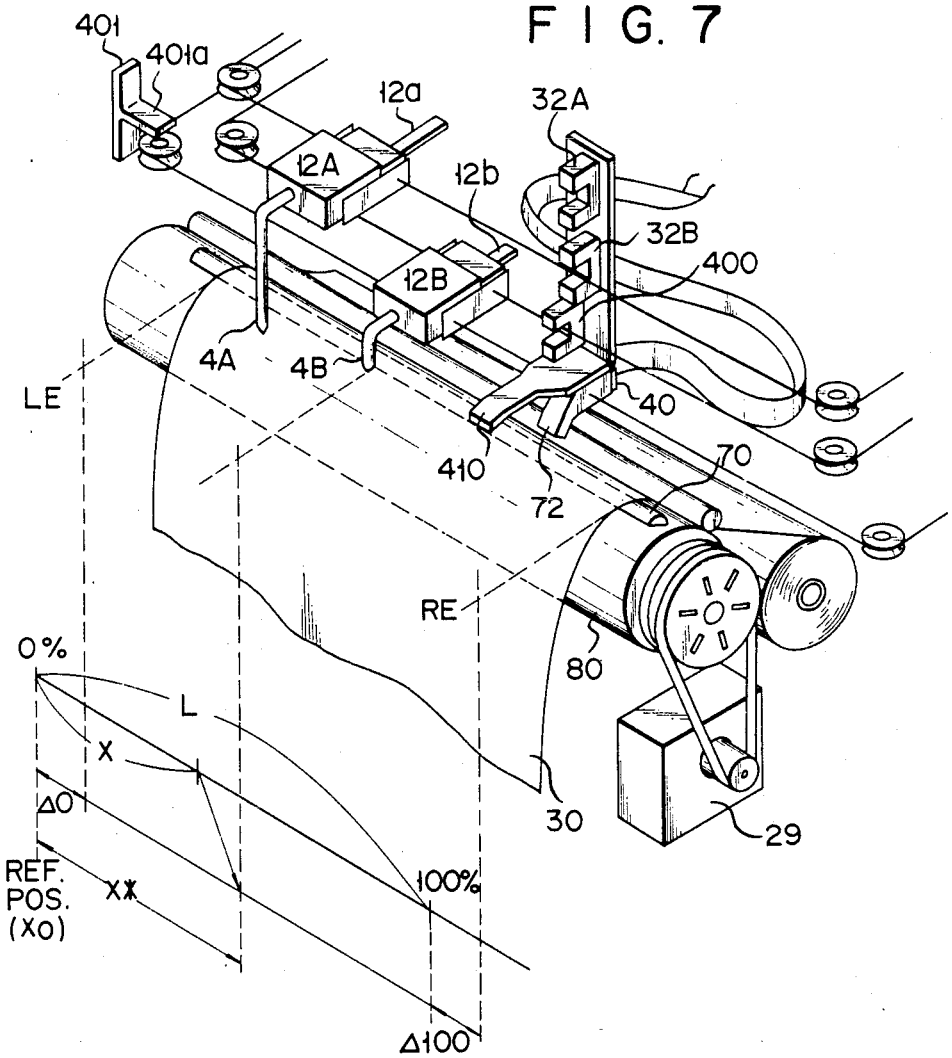
FIG. 7 is a perspective view of an important part of still another embodiment of the present invention, showing an arrangement in which even when a position of a recording paper with respect to a platen is deviated from its normal position, a pen position can be automatically corrected in correspondence with the deviation.

FIG. 7 shows still another embodiment of the present invention. In this embodiment, platen 80 is made of a transparent plastic tube, and rod-like light-emitting member 70 having a width greater than the width of paper 30 is fixed within the tube. The longitudinal axis of member 70 is parallel to a locus of reciprocation of carriage 40. Photosensor 72 opposite to member 70 is mounted to carriage 40. An output from photosensor 72 is supplied to CPU 24 through interrupt controller 43 in FIG. 1. Nontransparent paper 30 is fed between member 70 and photosensor 72.

According to the arrangement of FIG. 7, positions of left and right edges LE and RE of paper 30 are detected in accordance with the output level change point of photosensor 72. That is, each position of paper edges LE and RE is calculated in accordance with a count content of carriage position counter 340, using reference position $x_0$ representing a home position of carriage 40.

An operation of the embodiment shown in FIG. 7 is the same as that of the embodiment shown in FIG. 1 when the position of edge LE coincides with position $x_0$ or a difference between these positions is a known constant value. However, when the position of edge LE of paper 30 is deviated from a predetermined 0% position (e.g., position $x_0$) by $\Delta 0$ and the position of edge RE thereof is deviated from a predetermined 100% position by $\Delta 100$, position $x^*$ of pen 4A or 4B is corrected in accordance with the following equation:

$$x^* = x + (x/L)(\Delta 100 - \Delta 0) + \Delta 0 \qquad (10)$$

where L represents a standard value of the width of paper 30. Width L varies to some extent in accordance with an individual recording sheet of paper 30. Width L also slightly varies, even for the same recording sheet, depending upon an ambient humidity. In equation (10), x represents a pen position when both $\Delta 0$ and $\Delta 100$ are 0, and $x^*$ represents a corrected pen position when neither $\Delta 0$ nor $\Delta 100$ is 0. That is, when a step rotation amount and a step rotation direction of stepping motor 5A or 5B are controlled to move pen 4A or 4B to position $x^*$ which is calculated by equation (10), an accurate waveform corresponding to input aA or aB can be drawn on paper 30, even if a deviation such as $\Delta 0$ or $\Delta 100$ is present.

According to the embodiment of FIG. 7, even when paper 30 is set roughly with respect to platen 80 or paper 30 has a width which falls outside the standard value, accurate recording can be performed.

As has been described above, according to the present invention, there is provided a pen recorder which can accurately detect positions of a plurality of pens and hence can perform recording with improved accuracy, and which is not large in size and has a high reliability because no potentiometer is required.

Note that the present invention is not limited to the above embodiments, but can be modified without departing from the scope of the present invention. For example, a means, utilizing a Hall element or an ultrasonic wave, can be used as a means for detecting positions of pens 4A and 4B, instead of a photosensor. In addition, the detecting means may have an arrangement in which a light-emitting element is provided at the side of the pen carriage and a light-receiving element is provided at the side of the sensor carriage. Furthermore, when a scale is to be written on paper 30 in the arrangement of FIG. 7, a position ($x^*$), at which the scale is to be written by head 410, may be corrected in accordance with equation (10).

Obviously, numerous modifications and variations of the present invention are possible in light of the above teachings. It is therefore to be understood that within the scope of the appended claims, the invention may be practiced otherwise than as specifically described herein.

What is claimed is:

1. A pen recorder for recording information of an input signal on recording paper by a pen, comprising:

pen position detecting means for detecting an actual position of said pen with respect to a predetermined reference position;

recording position determining means for determining a recording position of said pen corresponding to the input signal; and pen position correcting means, coupled to said pen position detecting means and said recording position determining means, for correcting a position of said pen independtly of the input signal, so that the actual position of said pen coincides with the recording position of said pen, wherein said pen position correcting means includes: processing means for calculating a pen position correction amount and a pen position correction direction, in accordance with a difference between data of the actual position of said pen and data of the recording position of said pen; and actuator means for moving said pen, in a direction represented by said pen position correcting direction, by an amount corresponding to said pen position correction amount, wherein said pen position detecting means includes a position sensor, moving parallel to the movement of said pen, for generating a pen position detection signal which indicates the actual position of said pen obtained when said position sensor passes by said pen.

2. A recorder according to claim 1, further comprising:

pen shift means, coupled to said recording position determining means, for shifting a position of said pen in accordance with a content of said input signal, by means of an open loop control.

3. A recorder according to claim 2, wherein said pen shift means is in common with said actuator means.

4. A recorder according to claim 1, wherein the processing for calculating the pen position correction amount and the pen position correction direction is programmed in interrupt processing, and said processing means includes: a microcomputer for executing a program for operating said actuator means so that said pen moves in correspondence with said input signal, and for executing the interrupt program; and an interrupt controller for causing said microcomputer to execute the interrupt processing program when the pen position detection signal is generated.

5. A recorder according to claim 4, wherein said position detecting means includes: a home position sensor, moving together with said position sensor, for generating a home position signal when said home position sensor moves to the predetermined reference position; and a position counter for outputting first count data representing the predetermined reference position when the home position signal is generated, and for outputting second count data representing the actual position of said pen when the pen position detection signal is generated, said first and second count data being supplied to the microcomputer for the interrupt processing.

6. A recorder according to claim 1, wherein said position sensor generates the pen position detection signal when said position sensor passes by said pen without contacting each other.

7. A recorder according to claim 1, wherein said pen position detecting means includes writing means, moving together with said position sensor, for writing information, being different from writing information of said pen, on said recording paper.

8. A recorder according to claim 1, wherein two or more of said pen and said position sensor are provided, and said position sensors move together.

9. A recorder according to claim 1, further comprising:

recording paper edge detecting means for detecting one edge of said recording paper set on a platen of the pen recorder, and wherein said pen position correcting means includes means, coupled to said recording paper edge detecting means, for calculating an interval between a second predetermined reference position and said edge of said recording paper, for performing the pen position correcting operation in accordance with the actual position and the recording position of said pen, and for shifting a position of said pen by an amount corresponding to the interval.

10. A recorder according to claim 1, further comprising:

recording paper edge detecting means for detecting one edge and the other edge of said recording paper set on a platen of the pen recorder, and wherein said pen position correcting means includes means, coupled to said recording paper edge detecting means, for calculating a first interval between a second predetermined reference position and the edge of recording paper and a second interval between a third predetermined reference position and the other edge of the recording paper, for performing the pen position correcting operation in accordance with the actual position and the recording position of said pen, and for shifting a position of said pen by a correction amount corresponding to the first and second intervals.

11. A pen recorder for recording information of an input signal on recording paper by a pen, comprising:

pen position detecting means for detecting an actual position of said pen with respect to a predetermined reference position;

recording position determining means for determining a recording position of said pen corresponding to the input signal; and pen position correcting means, coupled to said pen position detecting means and said recording position determining means, for correcting a position of said pen independently of the input signal, so that the actual position of said pen coincides with the recording position of said pen, wherein said pen position detecting means includes a position sensor, moving parallel to the movement of said pen, for generating a pen position detection signal which indicates the actual position of said pen obtained when said position sensor passes by said pen.

12. A recorder according to claim 11, wherein said pen position correcting means includes: processing means for calculating a pen position correcting amount and a pen position correction direction, in accordance with a difference between data of te actual position of said pen data of the recording position of said pen; and actuator means for moving said pen, in a direction represented by said pen position correction direction, by an amount corresponding to said pen position correction amount.

13. A recorder according to claim 11, further comprising:
recording paper edge detecting means for detecting one edge and the other edge of said recording paper set on a platen of the pen recorder, and wherein
said pen position correcting means includes means, coupled to said recording paper edge detecting means, for calculating a first interval between a second predetermined reference position and the edge of recording papaer and a second interval between a third predetermined reference position and the other edge of the recording paper, for performing the pen position correcting operation in accordance with the actual position and the recording position of said pen, and for shifting a position of said pen by a correction amount corresponding to the first and second intervals.

14. A recorder according to claim 12, wherein the processing for calculating the pen position correction amount and the pen position correction direction is programmed in interrupt processing, and
said processing means includes: a microcomputer for executing a program for operating said actuator means so that said pen moves in correspondence with said input signal, and for executing the interrupt program; and an interrupt controller for causing said microcomputer to execute the interrupt processing program when the pen position detection signal is generated.

15. A recorder according to claim 14, wherein said position detecting means includes: a home position sensor, moving together with said position sensor, for generating a home position signal when said home position sensor moves to the predetermined reference position; and a position counter for outputting first count data representing the predetermined reference position when the home position signal is generated, and for outputting second count data representing the actual position of said pen when the pen position detection signal is generated, said first and second count data being supplied to the microcomputer for the interrupt processing.

16. A recorder according to claim 2, further comprising:
pen shift means, coupled to said recording position determining means, for shifting a position of said pne in accordance with a content of said input signal, by means of an open loop control.

17. A recorder according to claim 16, wherein said pen shift means is in common with said actuator means.

18. A recorder according to claim 13, wherein said position sensor generates the pen position detection signal when said position sensor passes by said pen without contacting each other.

19. A recorder according to claim 13, wherein said pen position detecting means includes writing means, moving togther with said position sensor, for writing informaiton, being different from writing information of said pen, on said recording paper.

20. A recorder according to claim 13, wherein two or more of said pen and said position sensor are provided, and said position sensors move together.

21. A recorder according to claim 13, further comprising:
recording paper edge detecting means for detecting one edge of said recording paper set on a platen of the pen recorder, and wherein said pen position correcting means includes means, coupled to said recording paper edge detecting means, for calculating an interval between a second predetermined reference position and said edge of said recording paper, for performing the pen position correcting operation in accordance with the actual position and the recording position of said pen, and for shifting a position of said pen by an amount corresponding to the interval.

* * * * *

UNITED STATES PATENT AND TRADEMARK OFFICE
CERTIFICATE OF CORRECTION

PATENT NO. : 4,751,526

DATED : Jun. 14, 1988

INVENTOR(S) : Masahiro TOHARA

It is certified that error appears in the above-identified patent and that said Letters Patent is hereby corrected as shown below:

On the Title page, and in column 1, line 2, the Title should be corrected to read as follows:

-- PEN RECORDER HAVING PEN POSITION SENSING AND POSITION CORRECTING --

Signed and Sealed this

Twenty-fifth Day of October, 1988

Attest:

DONALD J. QUIGG

*Attesting Officer*     *Commissioner of Patents and Trademarks*